(12) United States Patent
Shapiro

(10) Patent No.: US 9,363,317 B2
(45) Date of Patent: Jun. 7, 2016

(54) METHOD AND SYSTEM FOR GLOBAL NAMESPACE WITH CONSISTENT HASHING

(71) Applicant: DSSD, Inc., Menlo Park, CA (US)

(72) Inventor: Michael W. Shapiro, San Francisco, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 14/439,310

(22) PCT Filed: Oct. 24, 2013

(86) PCT No.: PCT/US2013/066491
§ 371 (c)(1),
(2) Date: Apr. 29, 2015

(87) PCT Pub. No.: WO2014/074316
PCT Pub. Date: May 15, 2014

(65) Prior Publication Data
US 2015/0304422 A1  Oct. 22, 2015

Related U.S. Application Data

(63) Continuation of application No. 13/671,996, filed on Nov. 8, 2012, now Pat. No. 8,589,659.

(51) Int. Cl.
*G06F 3/06* (2006.01)
*H04L 29/08* (2006.01)
*G06F 17/30* (2006.01)

(52) U.S. Cl.
CPC .......... *H04L 67/1097* (2013.01); *G06F 3/0604* (2013.01); *G06F 3/067* (2013.01); *G06F 3/0641* (2013.01); *G06F 3/0644* (2013.01); *G06F 3/0667* (2013.01); *G06F 3/0685* (2013.01); *G06F 17/302* (2013.01)

(58) Field of Classification Search
CPC ... G06F 3/0604; G06F 3/0644; G06F 3/0667; G06F 3/067; G06F 17/302
See application file for complete search history.

(56) References Cited

U.S. PATENT DOCUMENTS 7,647,329 B1   1/2010  Fischman et al.
7,949,630 B1 *  5/2011  Auchmoody ....... G06F 11/1453
                                                        707/609

(Continued)

FOREIGN PATENT DOCUMENTS

JP   2012-506582 A    3/2012
WO   2012046585 A1    4/2012

OTHER PUBLICATIONS

International Search Report issued in PCT/US2013/066491 mailed on Jan. 3, 2014 (2 pages).

(Continued)

*Primary Examiner* — Aracelis Ruiz
(74) *Attorney, Agent, or Firm* — Osha Liang LLP

(57) ABSTRACT

A method for writing data to a storage pool. The method includes receiving a virtual identifier (ID) and an offset for an object, extracting a node identifier (ID) that identifies a first storage server in the storage pool from the virtual ID, obtaining an object layout (OL) for the object from the first storage server, hashing an object ID and an offset ID to obtain a hashed value, where the virtual ID comprises the object ID and where the as offset ID is generated from the offset, identifying a second storage server in the storage pool using a global namespace layout (GL), the OL, and the hashed value hashed value, and issuing a write request to write data to the object in the second storage server, where the write request comprises the object ID and the offset.

20 Claims, 18 Drawing Sheets

(56) References Cited

U.S. PATENT DOCUMENTS 8,285,925 B1  10/2012  Sorenson, III et al.
8,392,428 B1 *  3/2013  Bonwick ............... G06F 3/0607
                                                707/747

OTHER PUBLICATIONS

International Preliminary Report on Patentability issued in PCT/US2013/066491, mailed May 21, 2015 (8 pages).
Office Action in corresponding Japanese application No. 2015-541796 dated Oct. 13, 2015 (4 pages).

* cited by examiner

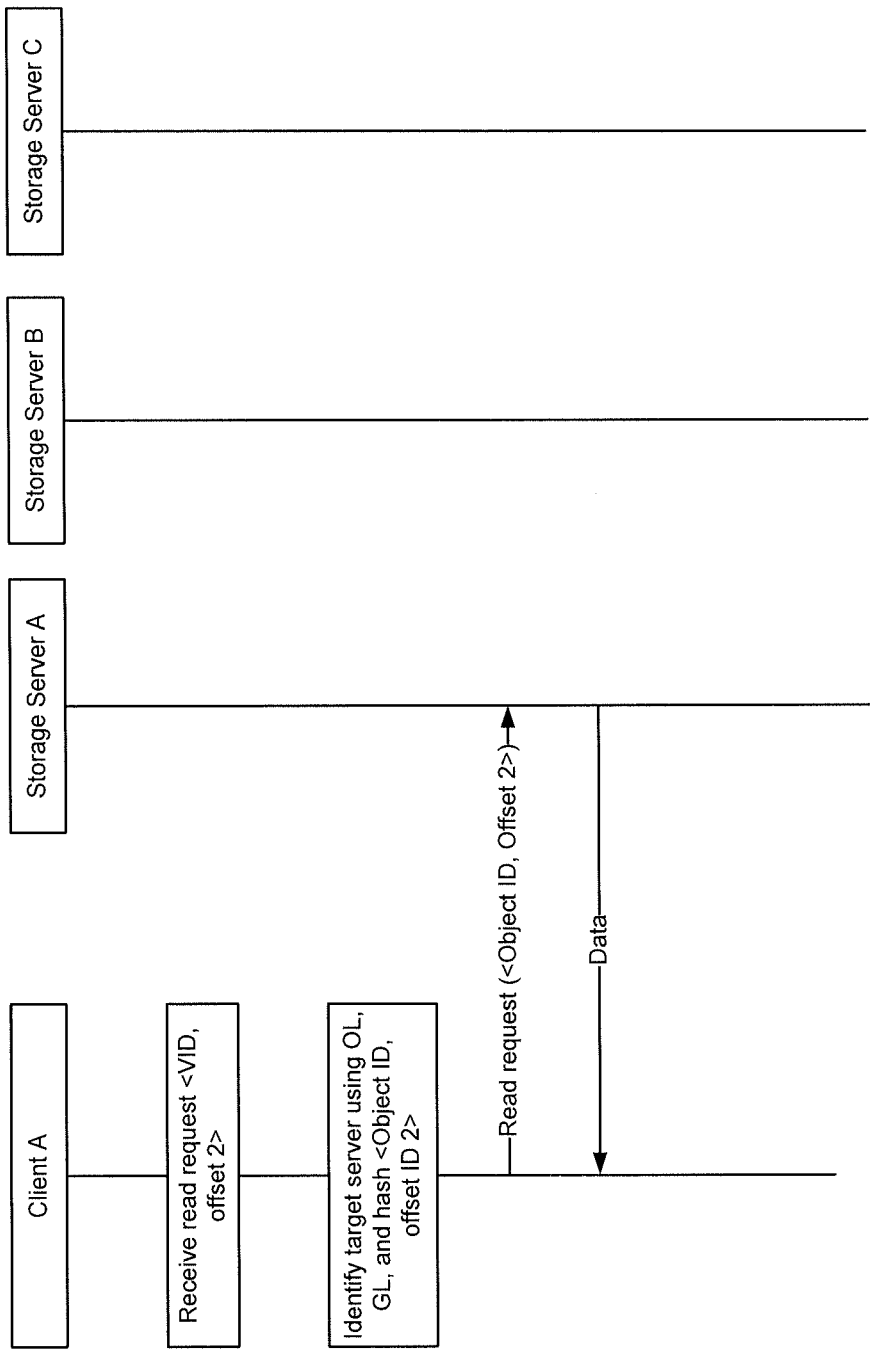

METHOD AND SYSTEM FOR GLOBAL NAMESPACE WITH CONSISTENT HASHING

BACKGROUND

Storage systems are required to store vast amounts of data and to permit the storage capacity to scale over time. The traditional approach to scaling storage capacity is to include one or more dedicated metadata servers in combination with one or more storage servers in a storage pool. The storage servers store the client data and the metadata servers store metadata (but no client data) about the location of the client data within the storage servers. As the storage capacity requirements increase, the number of storage servers may be increased and the amount of metadata stored in the metadata servers may increase.

In such scenarios, the metadata servers become a bottleneck in the processing of I/O requests. As such, the aforementioned traditional approach is unable to efficiently scale a storage pool without impacting performance, namely, latency, related to the processing of I/O requests.

SUMMARY

In general, in one aspect, the invention relates to a method for writing data to a storage pool. The method includes receiving a virtual identifier (ID) and an offset for an object, extracting a node identifier (ID) that identifies a first storage server in the storage pool from the virtual ID, obtaining an object layout (OL) for the object from the first storage server, hashing an object ID and an offset ID to obtain a hashed value, wherein the virtual ID comprises the object ID and wherein the offset ID is generated from the offset, identifying a second storage server in the storage pool using a global namespace layout (GL), the OL, and the hashed value, and issuing a write request to write data to the object in the second storage server, wherein the write request comprises the object ID and the offset.

In general, in one aspect, the invention relates to a method for reading data to a storage pool. The method includes receiving a virtual ID for an object, extracting a node identifier (ID) that identifies a first storage server in the storage pool from the virtual ID, obtaining an object layout (OL) for the object from the first storage server, hashing an object ID and an offset ID to obtain a hashed value, wherein the virtual ID comprises the object ID and wherein the offset ID is generated from the offset, identifying, using consistent hashing, a second storage server in the storage pool using a global namespace layout (GL), the OL, and the hashed value, and issuing a read request to read data from the object in the second storage server, wherein the write request comprises the object ID and the offset.

In general, in one aspect, the invention relates to a method for writing data to a storage pool. The method including receiving a request for a new object, selecting a storage server from the storage pool, wherein the storage server is identified using a Node ID, requesting the storage server to generate a virtual ID, wherein the virtual ID comprises the node ID and an object ID for the object, generating an object layout (OL) for the object using the virtual ID, storing the OL in the storage server, receiving a write request to write data to the object, wherein the write request comprises an offset, generating an offset ID from the offset, hashing the object ID and the offset ID to obtain a hashed value, identifying a second storage server in the storage pool using a global namespace layout (GL), the OL, and the hashed value, and issuing a write request to write the data to the object in the second storage server, wherein the write request comprises the object ID and the offset.

Other aspects the invention will be apparent from the following description and the appended claims.

BRIEF DESCRIPTION OF DRAWINGS

FIGS. 10A-10J show examples of a system implementing one or more embodiments of the invention.

DETAILED DESCRIPTION

Figure 1:
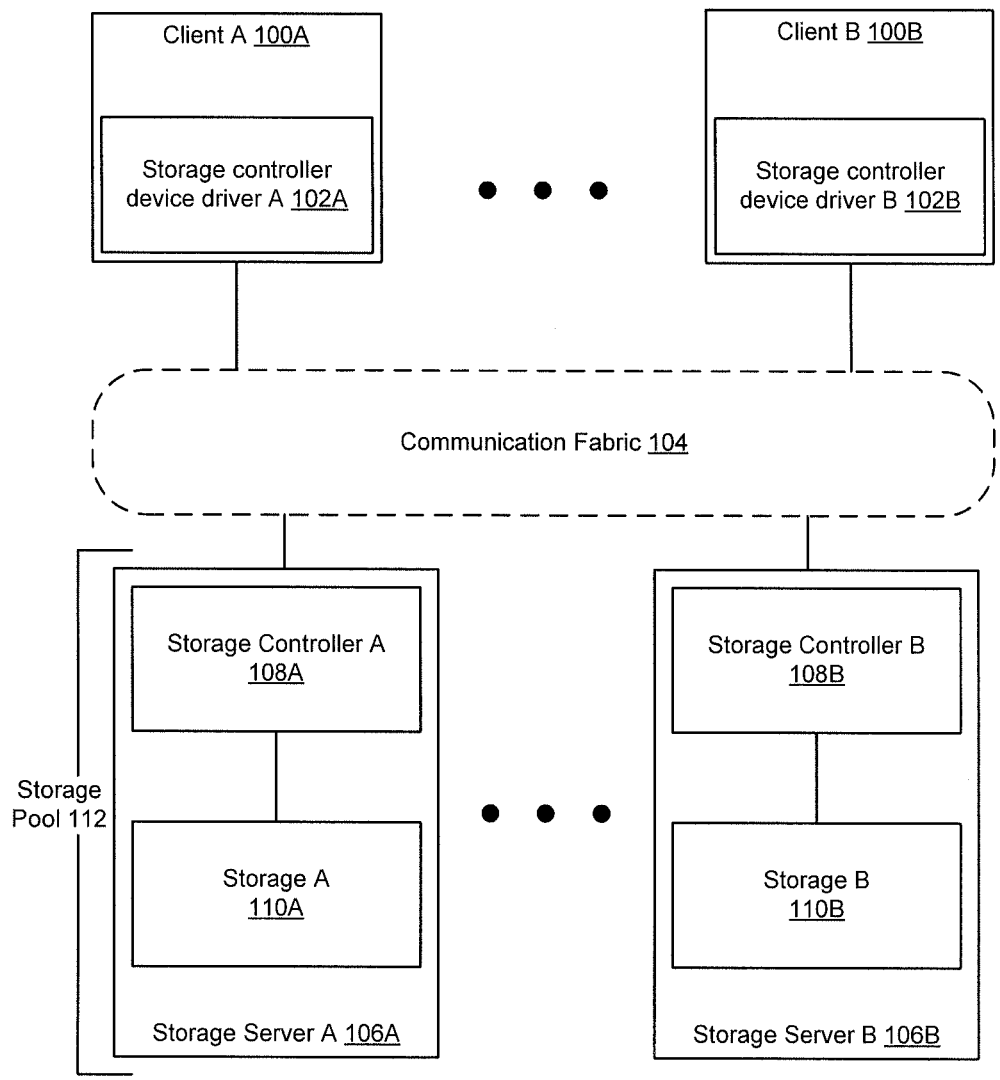
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-10J, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for storing data in a storage pool. More specifically, embodiments of the invention provide a global namespace for the storage pool that uses consistent hashing in combination with a global namespace layout (GL) for the storage pool and per-object object layouts (OLs) to determine the location(s) of objects in the storage pool.

In one embodiment of the invention, the system does not include dedicated metadata servers; rather, the OLs for the objects are distributed across the storage pool. Said another way, each storage server includes a combination of OLs and objects that include client data, where the OLs may or may not be associated with the particular objects stored on the storage server. Because embodiments of the invention do not include dedicated metadata servers, embodiments of the invention enable unlimited scaling of the capacity of the storage pool without latency penalties and scaling limits associated with metadata servers.

For purposes of this invention, an I/O request is a request that specifies a logical address of an object (i.e., data) stored on the client or the logical address of an object stored in memory or persistent storage that is operatively connected to the client. The I/O request may also include other information such as the size of the object. In one embodiment of the invention, the logical address may be an n-tuple: <object ID, offset> Any type of logical address may be used without departing from the invention. Examples of I/O requests include but are not limited to, read requests (i.e., requests to obtain data from an object stored in the storage pool) and write requests (i.e., requests to write data to an object in the storage pool).

FIG. 1 shows a system in accordance with one or more embodiments of the invention. The system includes one or more clients (100A, 100B), a communication fabric (104) and a storage pool (112) including one or more storage servers (106A, 106B). Each of these components is described below.

In one embodiment of the invention, a client (100A, 100B) is any physical system that includes functionality to issue I/O requests a storage server (106A, 106B). In one embodiment of the invention, the client may include a processor (not shown), memory (not shown), and persistent storage (not shown). The client further includes functionality to execute one or more applications (not shown). The applications may be user-level applications and/or kernel-level applications. The applications are configured to issue I/O requests, where the I/O requests issued by the applications are received and processed by storage controller device drivers (SCDDs) (102A, 102B).

The storage controller device driver (SCDD) (102A, 102B) is configured to receive and process the I/O requests in accordance with the embodiments shown in FIGS. 5-9. In one embodiment of the invention, the SCDD executes in the user-level (as opposed to the kernel level) of the client.

In one embodiment of the invention, the storage pool (112) includes one or more storage servers (106A, 106B), where each storage server includes a storage controller (108A, 108B) and storage (110A, 110B).

The storage controller (108A, 108B) is configured to implement various embodiments of the invention in accordance with FIGS. 3-9. In one embodiment of the invention, the storage controller includes a processor (not shown) configured to execute instructions to implement one or more embodiments of the invention, where the instructions are stored on a non-transitory computer readable medium (not shown) that is located within or that is operatively connected to the storage controller. Alternatively, the storage controller may be implemented using integrated circuits configured to provide the aforementioned functionality. Alternatively, the storage controller may be implemented using an FPGA, an ASIC, other specialized hardware or any combination thereof. The storage controller may be implemented using any combination of software and/or hardware without departing from the invention.

In one embodiment of the invention, storage (110A, 110B) includes one or more persistent storage devices including, but not limited to, magnetic memory devices, optical memory devices, solid state memory devices, phase change memory devices, any other suitable type of persistent memory device, or any combination thereof.

In one embodiment of the invention, the communication fabric (104) enables communication between the clients (100A, 100B) and the storage pool (112). The communication fabric may enable communication between the clients (100A, 100B) and the storage pool (112) using any wired, wireless, or hybrid (wired and wireless) connections.

The communication fabric may include a single switch or multiple interconnected switches (not shown). If the communication fabric includes multiple switches, each switch may be connected to every other switch, may be connected to a subset of the switches in the switch fabric, or may only be connected to one other switch. In one embodiment of the invention, each of the switches is a combination of hardware and logic (implemented, for example, using integrated circuits) (as defined by the protocol(s) the communication fabric implements) that is configured to permit communication between clients (100A, 100B) and the storage pool (112).

The communication fabric may facilitate communication using any communication protocol. Examples of such communication protocols may include, but are not limited to, Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. The invention is not limited to the aforementioned protocols.

System configurations other than the one shown in FIG. 1 may be used without departing from the invention.

FIGS. 2A-2D show data structures and relationships between data structures in accordance with one or more embodiments of the invention.

A global namespace layout (GL) specifies the state of the storage pool (or a portion thereof) over the life of the storage pool (or the portion thereof). At a given time, the state of the storage pool specifies (i) which storage servers are writeable in the storage pool and (ii) the write distribution across the storage servers that are writeable in the storage pool. More specifically, a storage server is deemed to be "writeable" when the data may be written to an object on the storage server. As such, there may be scenarios in which there are N number of storage servers in the storage pool but only M storage servers are "writeable" where M<N. Regardless of whether a storage server is "writeable", the storage server may service read requests in accordance with, for example, FIG. 8. With respect to the write distribution across the storage servers that are writeable, the write distribution across the storage servers that are writeable determines to which of the writeable storage servers data for a given object may be stored. Said another way, when a write request is received, the write distribution across the storage servers that are writeable determines to which of the storage servers that data will ultimately be stored.

Figure 2A:
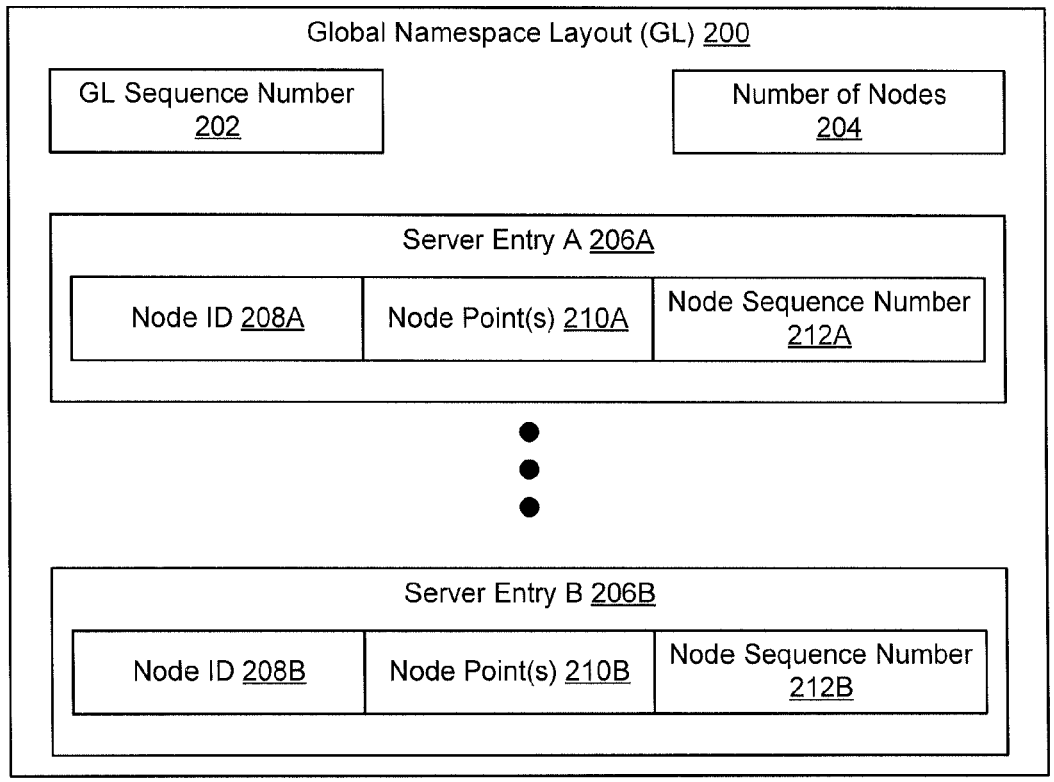
FIGS. 2A-2C show data structures and relationships between data structures in accordance with one or more embodiments of the invention.

Turning to FIG. 2A, the GL (200) includes a GL sequence number (202), the node count (204), and one or more server entries (206A, 206B). Each of these components is described below.

The GL sequence number (202) uniquely identifies a version of the GL across the lifetime of the storage pool. The node count (204) specifies the number of storage servers that are in the storage pool; however, as described above, not all storage servers may be "writeable".

Each server entry (206A, 206B) specifies the write distribution of a particular server at a given time. More specifically, the server entry may include, but is not limited to, (i) a node identifier (ID) (208A, 208B) that uniquely identifies the storage server in the storage pool (or within the portion of the storage pool that is associated with the GL), (ii) one or more node points (210A, 210B) (described below), and (iii) a node sequence number (212A, 212B) that specifies the GL sequence number to which this server entry applies.

With respect to the node points, a hash function is applied to each node ID to generate one or more values where the values are mapped to a number range [0, . . . , N]. The values are subsequently divided by N, thereby resulting in node points mapped to the number range [0, . . . , 1], which may be conceptually viewed as a unit circle (i.e., a circle with a radius of 1). The number and distribution of the node points within the number range [0, . . . , 1] for all storage servers describes the write distribution for the storage servers at a particular GL sequence number. If a particular storage server has no node points at a given GL sequence number, then that particular storage server is not "writeable" at that GL sequence number. The write distribution may be specified using other finite number ranges (i.e., number ranges other than [0, . . . , 1]) without departing from the invention.

Figure 4:
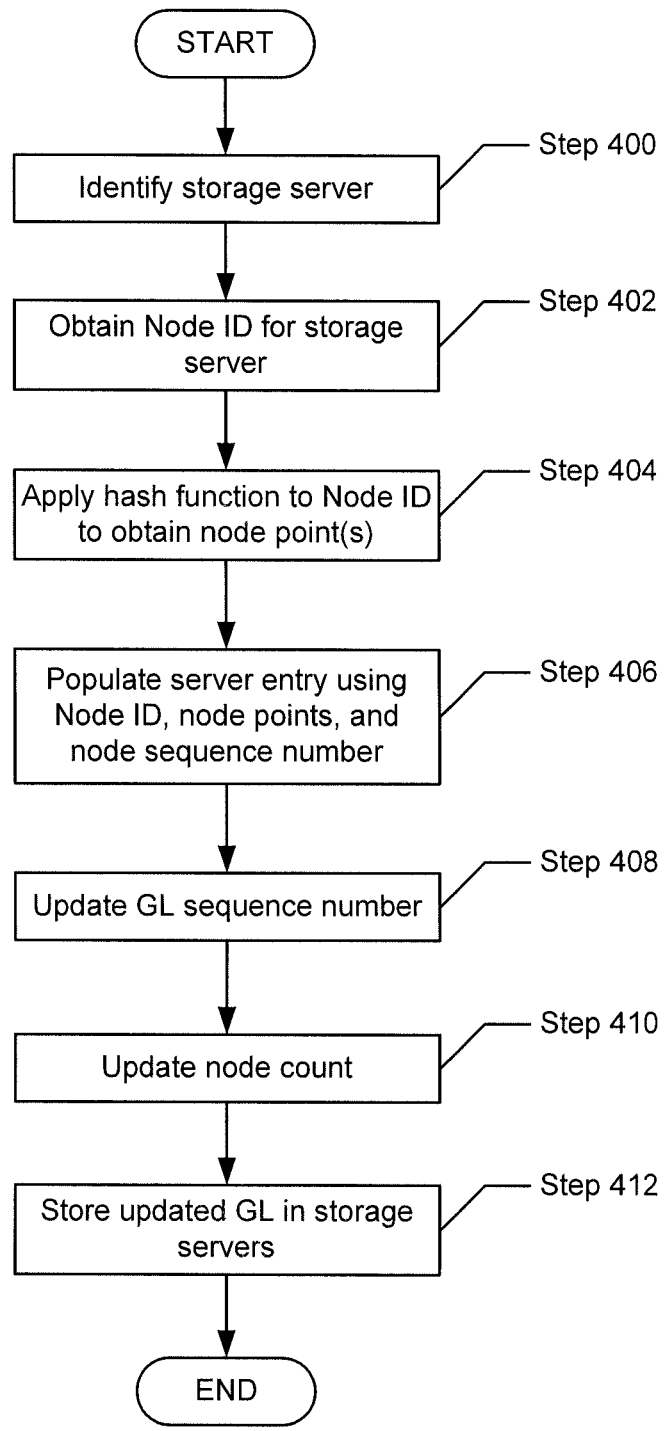
FIG. 4 shows a flowchart for adding a storage server to the storage pool in accordance with one or more embodiments of the invention.

In one embodiment of the invention, the GL sequence number is updated when either (i) the node point(s) for any of the storage servers in the storage pool (or a portion thereof) changes or (ii) a new storage server is added to the storage pool (see e.g., FIG. 4). The node point(s) for one or more storage servers may be modified in order to bias writes towards one or more storage servers and/or away from one or more storage servers based on a each storage servers free storage capacity. Alternatively, the node point(s) for one or more storage servers may be modified in order to ensure an even distribution of data across the storage servers in the storage pool as new storage servers are added to the storage pool. Alternatively, the node point(s) for one or more storage servers may be modified in order to account for the individual server bandwidth and/or I/O request processing capacity.

Figure 2B:
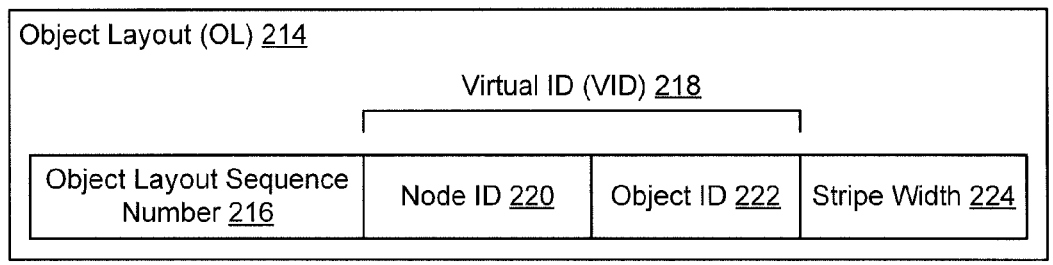

FIG. 2B shows an object layout (OL) in accordance with one embodiment of the invention. The OL (214) includes an OL sequence number (216), a virtual ID (VID) (218), and a stripe width (224). Each of these components is described below.

The OL sequence number (216) corresponds to the GL sequence number (202) of the GL (200) at the time the object corresponding to the OL (214) was first created. The virtual ID (218) includes a node ID (220) and an object ID (222). The node ID (220) identifies the storage server that generated the VID (218) and that includes a copy of the VID (218) (typically stored in the appropriate OL, see e.g., FIG. 6). The object ID (222) uniquely identifies the object in the global namespace (i.e., the object ID is unique with respect to all other object IDs in the storage servers over which the global namespace spans). The stripe width (224) corresponds to a unit of data that is sequentially transferred to storage server (identified by the GL) before advancing to the next storage server point in the GL. For example, if stripe width (SW) is 64 Kb and the object to be written to the storage pool is identified by an object ID and offset (O)=256 K and the size of the data to be written to object is 128 Kb, then two write requests will be issued where each request includes 64 Kb of data and where each write request may be serviced by a different storage server. Specifically, a OL for the object is identified using hash <VID, −1>. The first write request for the first 64 kb is issued to a storage server identified using hash <object ID, 256> and the GL and a second write request for the second 64 kb is issued to a storage server identified using hash <object ID, 256+64> and the GL. The selection of the particular storage servers using the aforementioned hashed values is described below. In one embodiment of the invention, the stripe width is set to equal the maximum transmission unit (MTU) supported by the storage server and/or communication fabric.

There is a single OL for each object in the storage pool. In one embodiment of the invention, once created, the OL for the object does not change. The OL is used to identify the state of the GL at the time the object corresponding to the OL was created. With this information, the object (or a portion thereof) may be located in the storage pool. (See e.g., FIGS. 7 and 8).

Figure 2C:
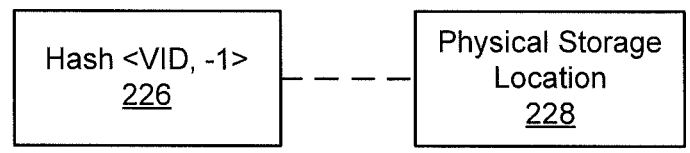

FIG. 2C shows a relationship between a hash value and a physical storage location in accordance with one or more embodiments of the invention. Each OL has a unique VID and is stored in at least one physical location in a storage server identified by the node ID, which is specified in the VID. (See e.g., FIG. 2B, 218). In one embodiment of the invention, the physical storage location (228) (i.e., the physical location in which the OL is stored) is mapped to a hash table entry in the storage server identified by the node ID. The hash table entry is associated with a hash value generated by hashing <VID, −1> (226). The hash table entry may also include a location of a copy of the OL in volatile memory of the storage server. Any hash function and any special offset (and not just −1) may be used without departing from the invention.

FIGS. 3-9 show flowcharts in accordance with one or more embodiments of the invention. While the various steps in each flowchart are presented and described sequentially, one of ordinary skill will appreciate that some or all of the steps may be executed in different orders, may be combined or omitted, and some or all of the steps may be executed in parallel. In one embodiment of the invention, one or more steps shown in FIGS. 3-9 may be performed in parallel with one or more other steps shown in FIGS. 3-9.

Figure 3:
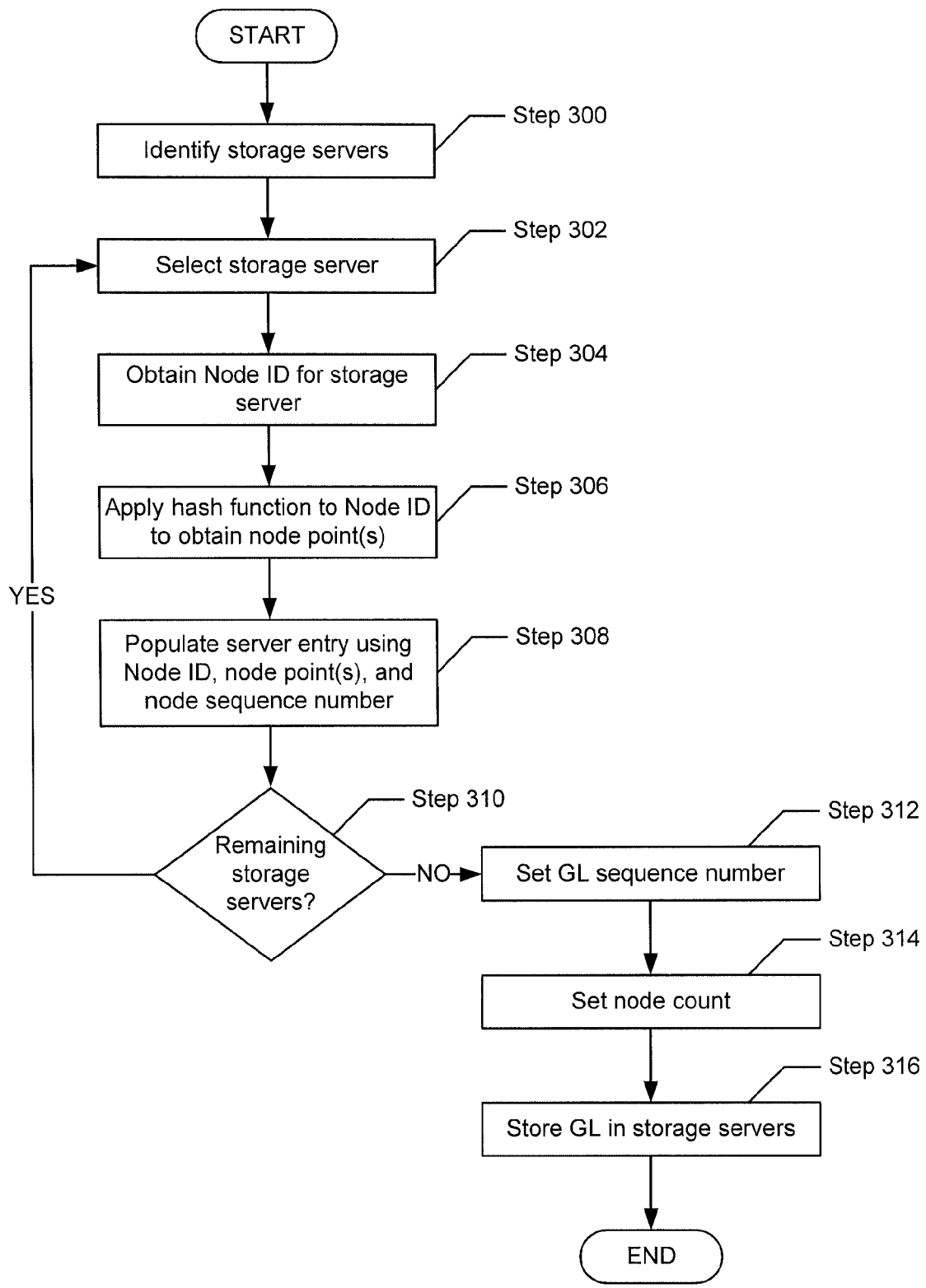
FIG. 3 shows a flowchart for initializing a storage pool in accordance with one or more embodiments of the invention.

FIG. 3 shows a flowchart for initializing a storage pool in accordance with one or more embodiments of the invention. The process shown in FIG. 3 may be performed by one of the storage servers in the storage pool or by one of the clients in the system. In Step 300, the storage servers to be included in the storage pool are identified. In Step 302, one of the storage servers identified in Step 300 is selected. In Step 304, a node ID is obtained for the storage server selected in Step 302. The node ID may be obtained and/or generated using any known mechanism for obtaining and/or generating an ID.

In Step 306, a hash function is applied to the Node ID to obtain one or more node points. The number of node points assigned to a given storage server may be determined based on a policy specified by a client, based on a policy specified by one or more storage servers, or based on a default policy associated with the storage pool. In Step 308, a server entry corresponding to the storage server identified in Step 302 is created and populated using the node ID, the node point(s), and a node sequence number. The node sequence number corresponds to the current GL sequence number. For example, if the server entry is created when the GL sequence number is 0 then the node sequence number is set to 0. FIG. 3 shows the generation of the initial GL. Accordingly, even though the GL sequence number in the GL may not be formally set in the GL at this stage, the GL sequence number is going to be the initial GL sequence number value, e.g., 1, and, as such, the node sequence number may be set prior to formally setting the initial GL.

In Step 310, a determination is made about whether there are additional storage servers to process. If there are additional storage servers to process, the process proceeds to Step 302; otherwise, the process proceeds to Step 312. In Step 312, the GL sequence number is set in the GL. FIG. 3 shows the generation of the initial GL. Accordingly, the GL sequence number is set to the initial GL sequence number value, e.g., 1. In Step 314, the node count is set, where the node count corresponds to the number of storage servers in the storage pool. In Step 316, the GL is stored in each of the servers in the storage pool.

FIG. 4 shows a flowchart for adding a storage server to the storage pool in accordance with one or more embodiments of the invention. In Step 400, an additional storage server to add to the storage pool is identified. Typically, this step occurs at some point after the process shown in FIG. 3 has been performed, for example, when an additional storage server is added to increase the storage capacity of the storage pool.

In Step 402, a node ID is obtained for the additional storage server. The node ID may be obtained and/or generated using any known mechanism for obtaining and/or generating an ID. In Step 404, a hash function is applied to the Node ID to obtain one or more node points. The node point(s) may be generated such that new write requests are biased towards the additional storage server. In Step 406, a server entry corresponding to the additional storage server identified in Step 400 is created and populated using the node ID, the node point(s), and a node sequence number. The node sequence number corresponds to the current GL sequence number incremented by 1. The server entry is added to the GL to obtain an updated GL.

In Step 408, the GL sequence number is updated in the updated GL. For example, the GL sequence number is incremented by 1. The node sequence number for the server entry created in Step 406 is equal to the updated GL sequence number. In Step 410, the node count is updated to reflect the additional storage server in the storage pool. In Step 412, the updated GL is stored in each of the servers in the storage pool. In one embodiment of the invention, there is only one GL stored on each storage server and, as such, when an updated GL is received by a storage server, the prior GL is deleted or otherwise removed from the storage server. In one embodiment of the invention, an updated GL may be obtained by a storage server in accordance with the process described in FIG. 5.

Figure 5:
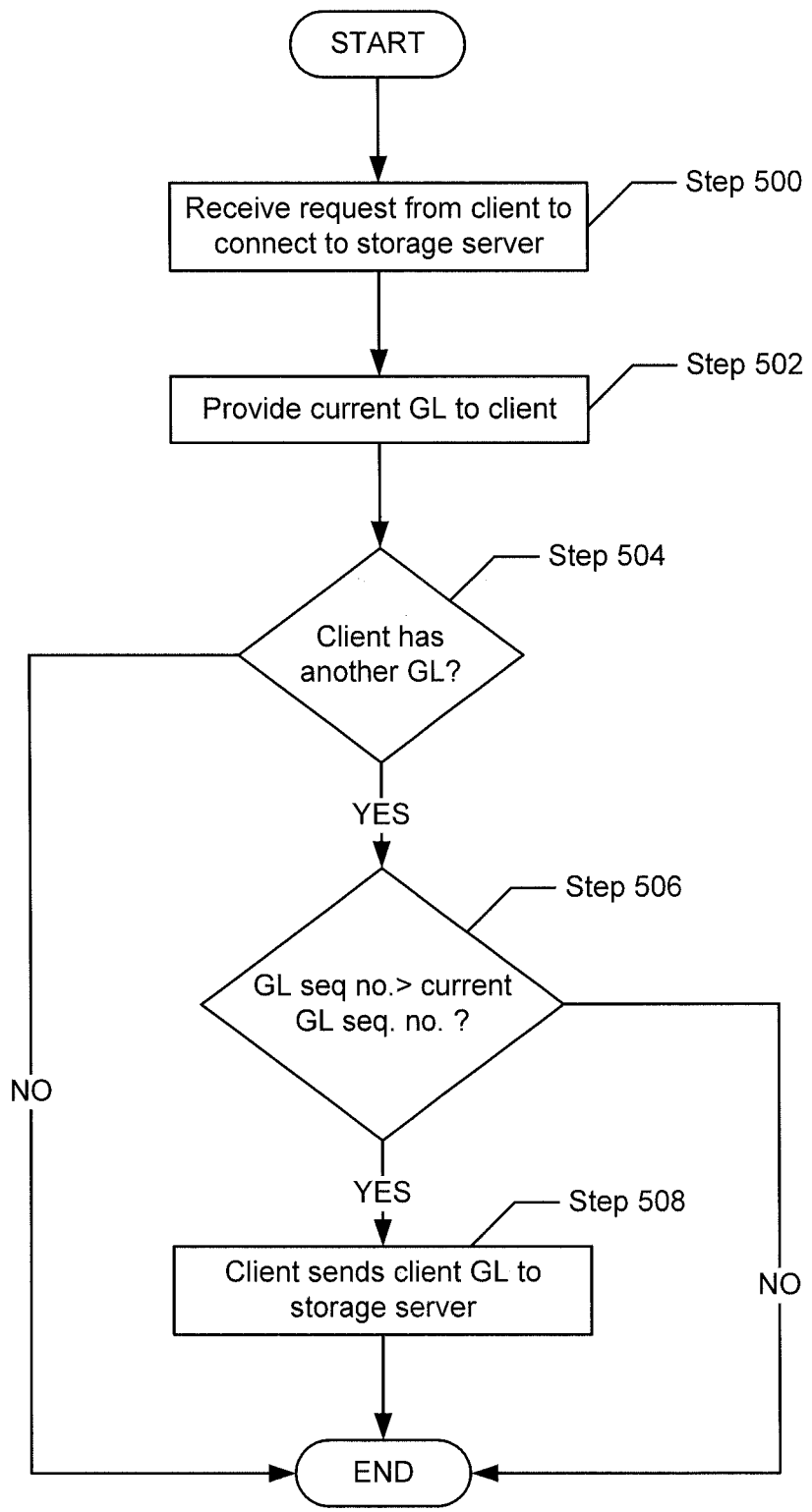
FIG. 5 shows a flowchart for connecting a client to the storage pool in accordance with one or more embodiments of the invention.

FIG. 5 shows a flowchart for connecting a client to the storage pool in accordance with one or more embodiments of the invention. In one embodiment of the invention, the process shown in FIG. 5 is performed by the SCDD (102A, 102B in FIG. 1).

In Step 500, one of the storage servers in the storage pool receives a request to connect from a client. In Step 502, in response to the request to connect, the storage server provides its current GL to the client. In Step 504, the client determines whether it already has a GL. In one embodiment of the invention, if the client has previously connected to another storage server in the storage pool, then the client already includes a GL (which may or may not be the same the current GL obtained in Step 502). If the client already has another GL, the process proceeds to Step 506; otherwise the process ends.

In Step 506, a determination is made about whether the GL obtained in Step 502 is the most current GL for the storage pool. More specifically, a determination is made about whether the sequence number of the GL obtained in Step 502 is greater than the sequence number of the GL that was previously obtained by the client. If the sequence number of the GL obtained in Step 502 is greater than the sequence number of the GL that was previously obtained by the client, the process proceeds to step 508; otherwise the process ends. In Step 508, the client sends the previously stored GL (i.e., a GL with a GL sequence number that is greater than the GL sequence number for the GL that it provided to the client) to the storage server.

Figure 6:
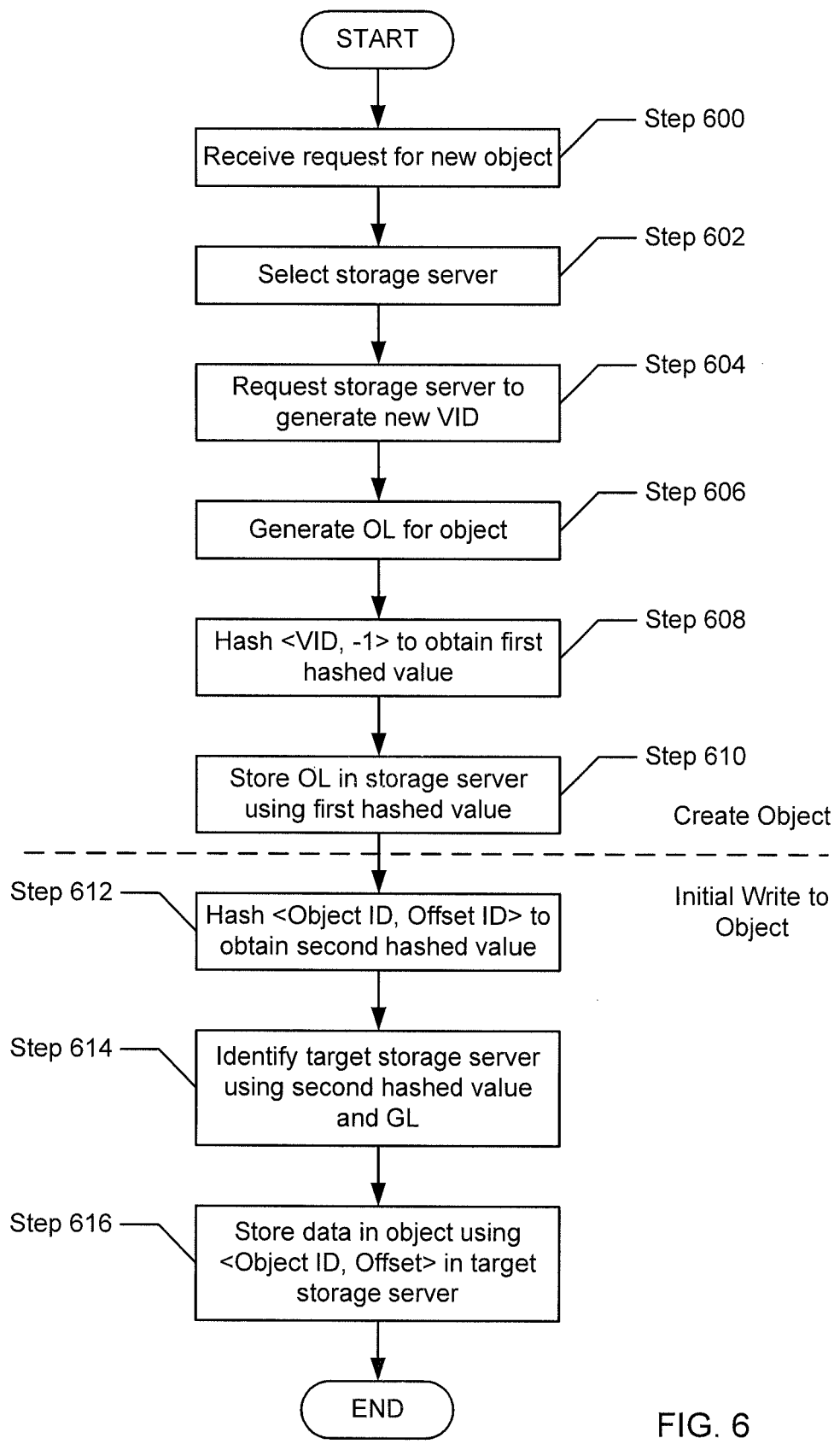
FIG. 6 shows a flowchart for creating an object and storing data in the object in accordance with one or more embodiments of the invention.

FIG. 6 shows a flowchart for creating an object and storing data in the object in accordance with one or more embodiments of the invention. In one embodiment of the invention, the process shown in FIG. 6 is performed by the SCDD (102A, 102B in FIG. 1).

In Step 600, a request to create a new object is received. In one embodiment of the invention, the request is issued by an application executing on the client and is received by the SCDD.

In Step 602, a storage server is selected. In one embodiment of the invention, the storage server is randomly selected from the storage pool or selected using a round robin algorithm. Any method of selecting a storage server from the storage pool may be used without departing from the invention.

In Step 604, a request is sent to the storage server identified in Step 602 to generate a new virtual ID (VID). The VID includes the node ID, which identifies the storage server and an object ID, which identifies a new object in the storage pool.

In Step 606, an object layout (OL) for the object is created. The OL may be created by the storage server or by the SCDD. In particular, both the storage server and the SCDD include the necessary information to populate the OL for the object.

In Step 608, <VID, −1> is hashed to obtained a first hashed value. As discussed above, any special offset (other than −1) may be used with departing from the invention. In Step 610, the OL for the object is stored in the storage server using the first hashed value. As described above, the first hashed value is associated with a hash table entry on the storage server, where the hash table entry is associated with at least one physical location in the storage of the storage server at which the OL is stored. At this stage the object and corresponding OL have been created; however, no data has been stored in the object. The following steps describe how data is initially stored in the object.

In Step 612, <object ID, offset ID> is hashed to obtained a second hashed value. More specifically, an application on the client requests data associated with the VID and an offset to be stored in the object. In response, the SCDD obtains the object ID from the VID and the offset ID is obtained by applying a bit mask based on the stripe width to the offset.

In Step 614, a target storage server in the storage pool is identified using the second hashed value, the GL, and the OL for the object. More specifically, the OL sequence number is extracted from the OL and used to determine which storage servers were "writeable" when the OL was created. In one embodiment of the invention, determining which storage servers were "writeable" includes (i) identifying all server entries that have node sequence numbers less than or equal to the OL sequence number; (ii) analyzing any server entries that have the same node ID to determine one or more node points that were writeable when the OL was created; (iii) generate a final set of node points from (i) and (ii); and (iv) using consistent hashing along with the second hashed value and the node points to identify the target server. Consistent hashing is further described with respect to FIGS. 10A-10J.

The following is an example of determining which storage servers were "writeable" when the OL was created. This example is not intended to limit the scope of the invention.

Consider the scenario in which the GL has the following server entries:

E1: [Node A, [A1, A2], S1]
E2: [Node A, [A3], S2]
E3: [Node B, [B1], S1]
E4: [Node C, [C1, C2], S2]
E5: [Node D, [D1], S3]

Further, the OL for the object is as follows:

OL: [S2, VID, SW]

Accordingly, the server entries that have a node sequence number less than or equal to the OL sequence number are E1, E2, E3, and E4. Further, E1 and E2 have the same node ID, namely, Node A, but different node points at different node sequence numbers and, accordingly, E1 and E2 are analyzed to determine which node points should be associated with the storage server identified as Node A at S2. In this example, there is only one node point, A3, at S2. Accordingly, the final set of node points is A3, B1, C1, and C2.

Continuing with FIG. 6, in Step 616, a write request to store data in the object is sent to the target server, where the request specifies the object ID and offset. The aforementioned request may use any logical address without departing from the invention.

Figure 7:
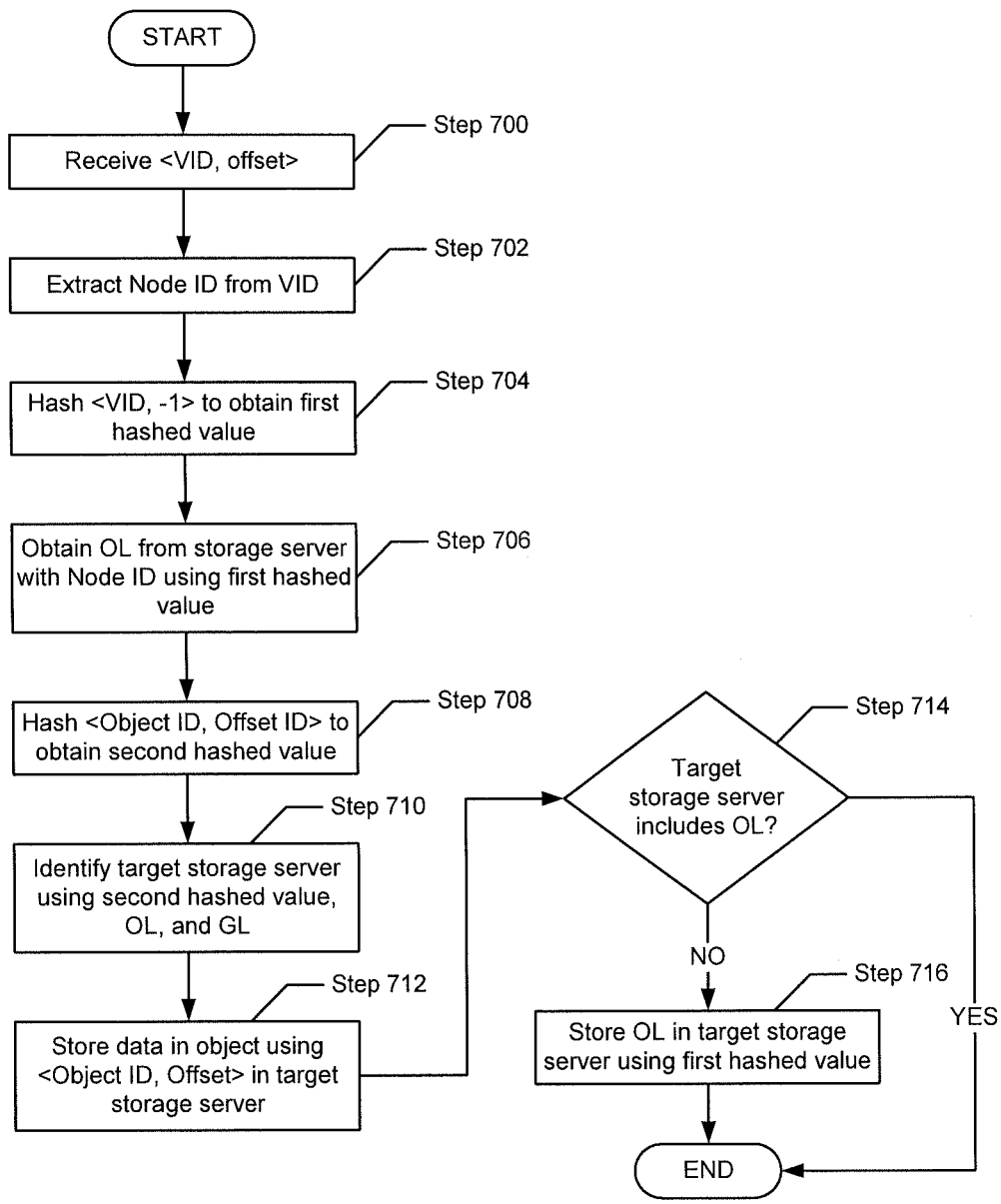
FIG. 7 shows a flowchart for writing data to a previously created object in the storage pool in accordance with one or more embodiments of the invention.

FIG. 7 shows a flowchart for writing data to a previously created object in the storage pool in accordance with one or more embodiments of the invention. In one embodiment of the invention, the process shown in FIG. 7 is performed by the SCDD (102A, 102B in FIG. 1).

In Step 700, a <VID, offset> is received. In Step 702, the node ID is extracted from the VID. In Step 704, <VID, −1> is hashed to obtained a first hashed value. As discussed above, any special offset (other than −1) may be used with departing from the invention. In Step 706, an OL from storage server identified by the node ID is obtained using the first hashed value. If the SCDD has previously obtained the OL (e.g., when performing various steps in FIG. 6), then steps 702-706 may not need to be performed and, instead, the client may use the previously cached OL.

In Step 708, <object ID, offset ID> is hashed to obtained a second hashed value. In one embodiment of the invention object ID is obtained from the VID and the offset ID is obtained by applying a bit mask based on the stripe width to the offset. In Step 710, a target storage server in the storage pool is identified using the second hashed value, the GL, and the OL for the object. The target server is identified using the same process as described in Step 614 in FIG. 6. In Step 712, a request to store data in the object is sent to the target server, where the request specifies the object ID and offset. The aforementioned request may use any logical address without departing from the invention. In Step 714, a determination is made about whether the target storage server includes the OL. If the target storage server includes the OL the process ends; otherwise, the process proceeds to Step 716. In Step 716, the OL is stored in the target storage server using the first hashed value. In this manner, additional copies of a given OL are stored in various storage servers in the storage pool. This allows a client to obtain an OL for a server other than the server identified by the node ID using hash <VID, −1>.

Figure 8:
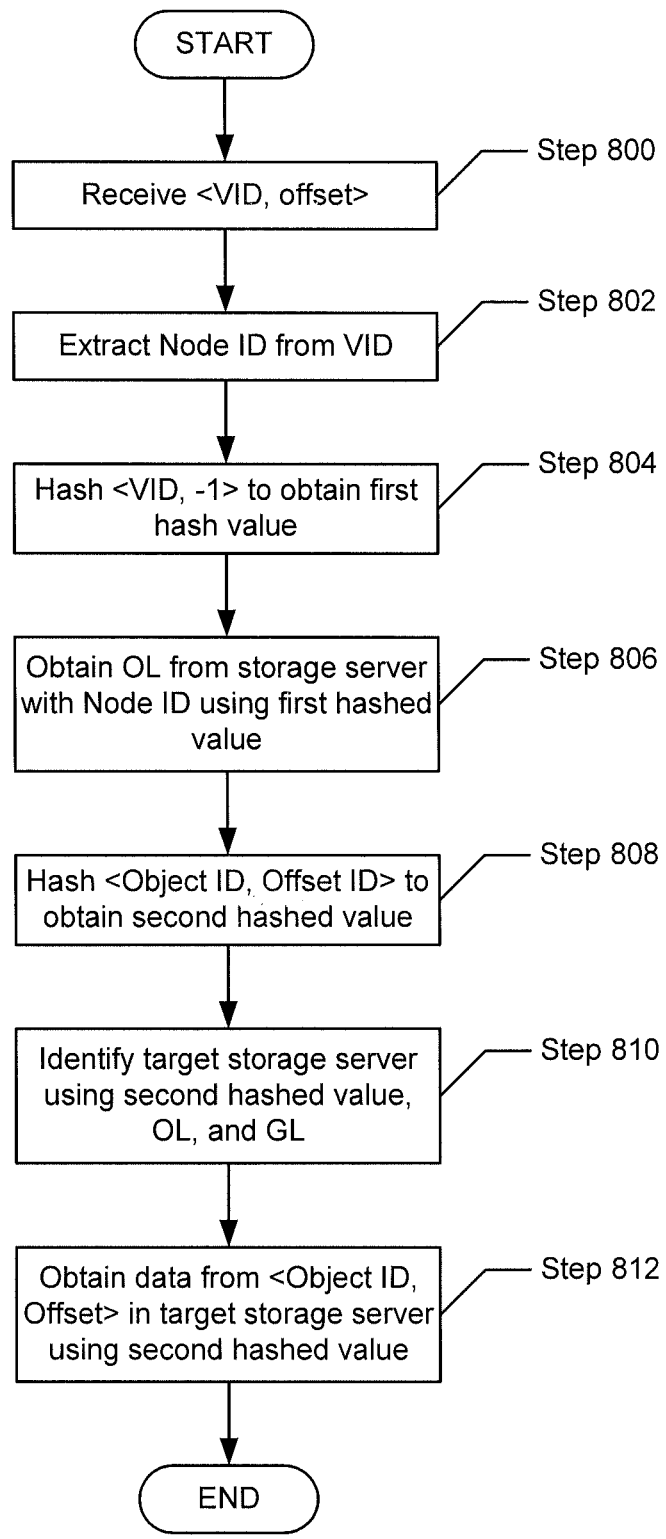
FIG. 8 shows a flowchart for read data from an object in the storage pool in accordance with one or more embodiments of the invention.

FIG. 8 shows a flowchart for read data from an object in the storage pool in accordance with one or more embodiments of the invention. In one embodiment of the invention, the process shown in FIG. 8 is performed by the SCDD (102A, 102B in FIG. 1).

In Step 800, a <VID, offset> is received. In Step 802, the node ID is extracted from the VID. In Step 804, <VID, −1> is hashed to obtained a first hashed value. As discussed above, any special offset (other than −1) may be used with departing from the invention. In Step 806, an OL from storage server identified by the node ID is obtained using the first hashed value. If the SCDD has previously obtained the OL, then steps 802-806 may not need to be performed. Instead, the SCDD may search the client to obtain the OL.

In Step 808, <object ID, offset ID> is hashed to obtained a second hashed value. In one embodiment of the invention, the object ID is obtained from the VID and the offset ID is obtained by applying a bit mask based on the stripe width to the offset. In Step 810, a target storage server in the storage pool is identified using the second hashed value, the GL, and the OL for the object. The target server is identified using the same process as described in Step 614 in FIG. 6. In Step 812, a read request in the object is sent to the target server, where the request specifies the object ID and offset. The aforementioned request may use any logical address without departing from the invention.

Figure 9:
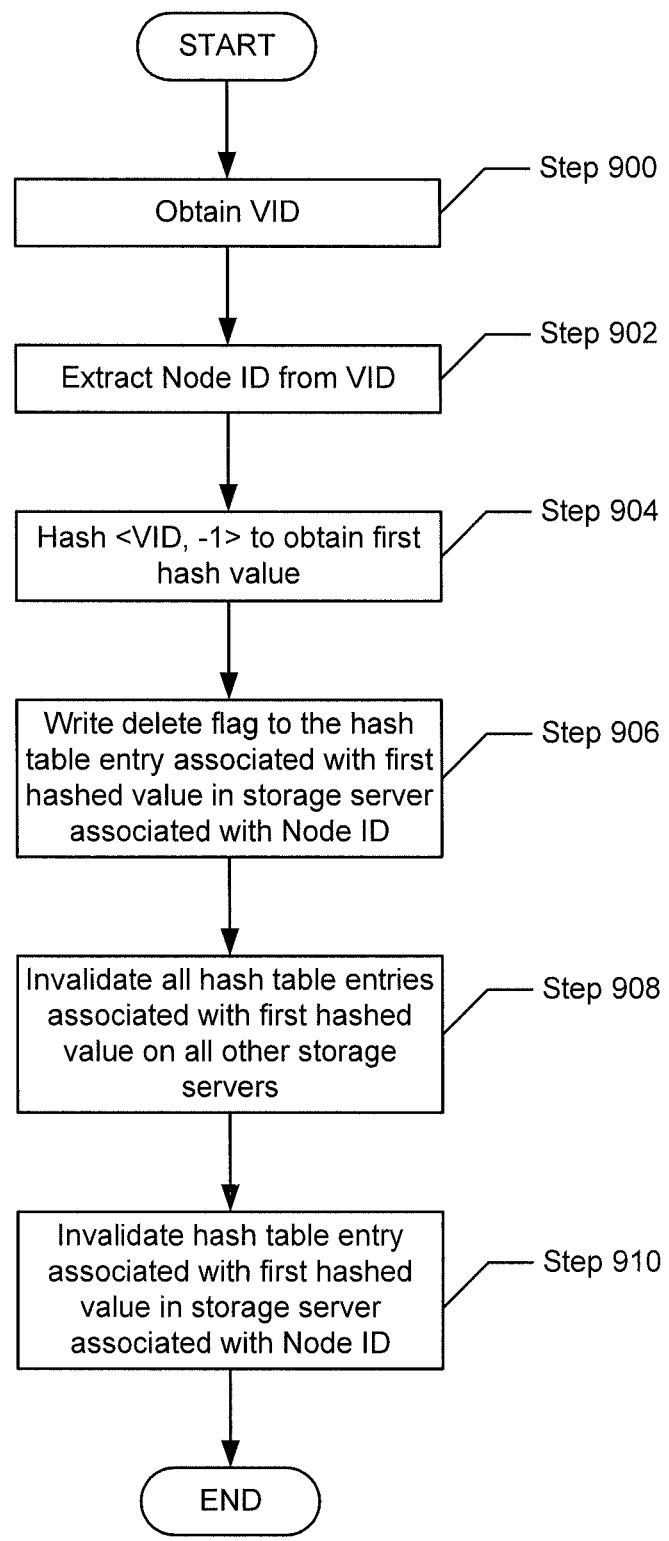
FIG. 9 shows a flowchart for deleting an object in the storage pool in accordance with one or more embodiments of the invention.

FIG. 9 shows a flowchart for deleting an object in the storage pool in accordance with one or more embodiments of the invention. In one embodiment of the invention, the process shown in FIG. 9 is performed and/or initiated by the SCDD (102A, 102B in FIG. 1).

In Step 900, a VID is obtained, where the VID corresponds to the object to be deleted from the storage pool. In Step 902, the node ID is extracted from the VID. In Step 904, <VID, −1> is hashed to obtained a first hashed value. As discussed above, any special offset (other than −1) may be used with departing from the invention. In Step 906, a delete flag is written to the hash table entry corresponding to the first hashed value in the storage server identified with the Node ID. In Step 908, all hash table entries corresponding to the first hashed value in all other storage servers in the storage pool are invalidated. In Step 910, the hash table entry corresponding to the first hashed value in the storage server identified with the Node ID is invalidated. At this stage, the physical storage previously allocated to store the now invalidated object and/or OL can be reclaimed using any known storage reclaiming algorithm.

FIGS. 10A-10J show examples in accordance with one or more embodiments of the invention. The example is not intended to limit the scope of the invention. Further, various components in the client and storage servers have been omitted for purposes of clarity in FIGS. 10A-10J.

Figure 10A:
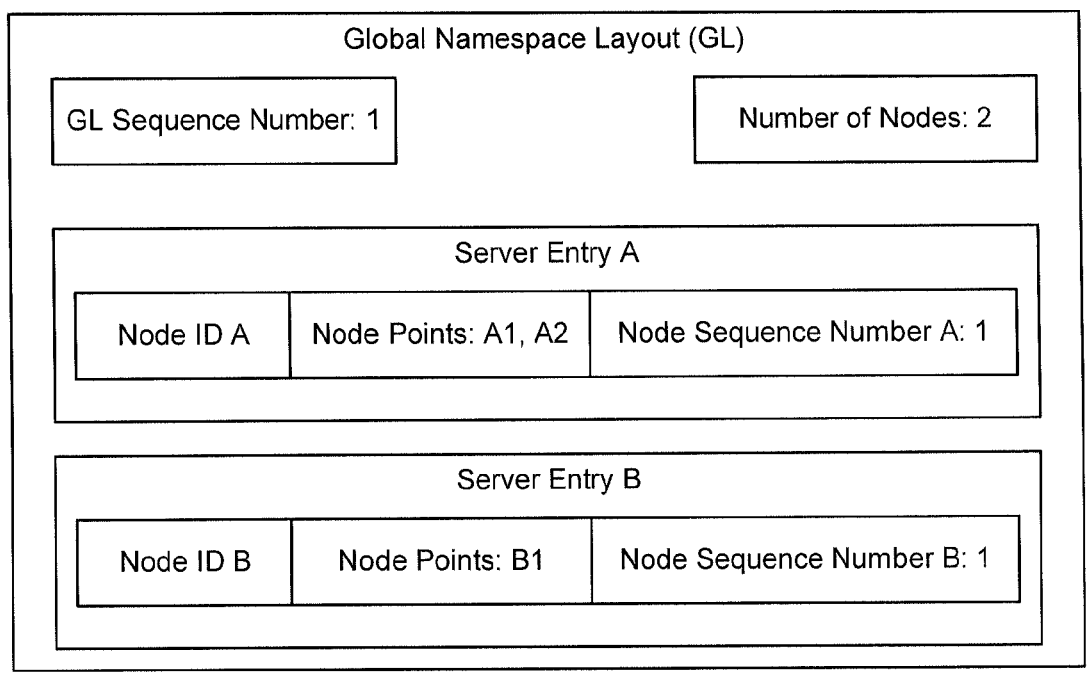

Consider a scenario in which a system includes a client connected to a storage pool that initially includes has two storage servers. FIG. 10A shows an initial GL for the storage pool. Referring to FIG. 10A, the GL includes a server entry (Server Entry A, Server Entry B) for each of the storage servers. Specifically, Server Entry A corresponds to Storage Server A (see FIG. 10B) and specifies the following: (i) Node ID A, which uniquely identifies Storage Server A in the storage pool, (ii) node points: A1, A2 (see FIG. 10D), and (iii) Node Sequence Number A:1, which indicates that the Server Entry A was added to the GL when the GL sequence number was equal to 1. Similarly, Server Entry B corresponds to Storage Server B (see FIG. 10B) and specifies the following: (i) Node ID B, which uniquely identifies Storage Server B in the storage pool, (ii) node points: B1 (see FIG. 10D), and (iii) Node Sequence Number B:1, which indicates that the Server Entry B was added to the GL when the GL sequence number was equal to 1. The GL also includes a GL sequence number set to 1, as this is the initial GL, and a node count is set to 2 as there are two storage servers in the storage pool.

Figure 10B:
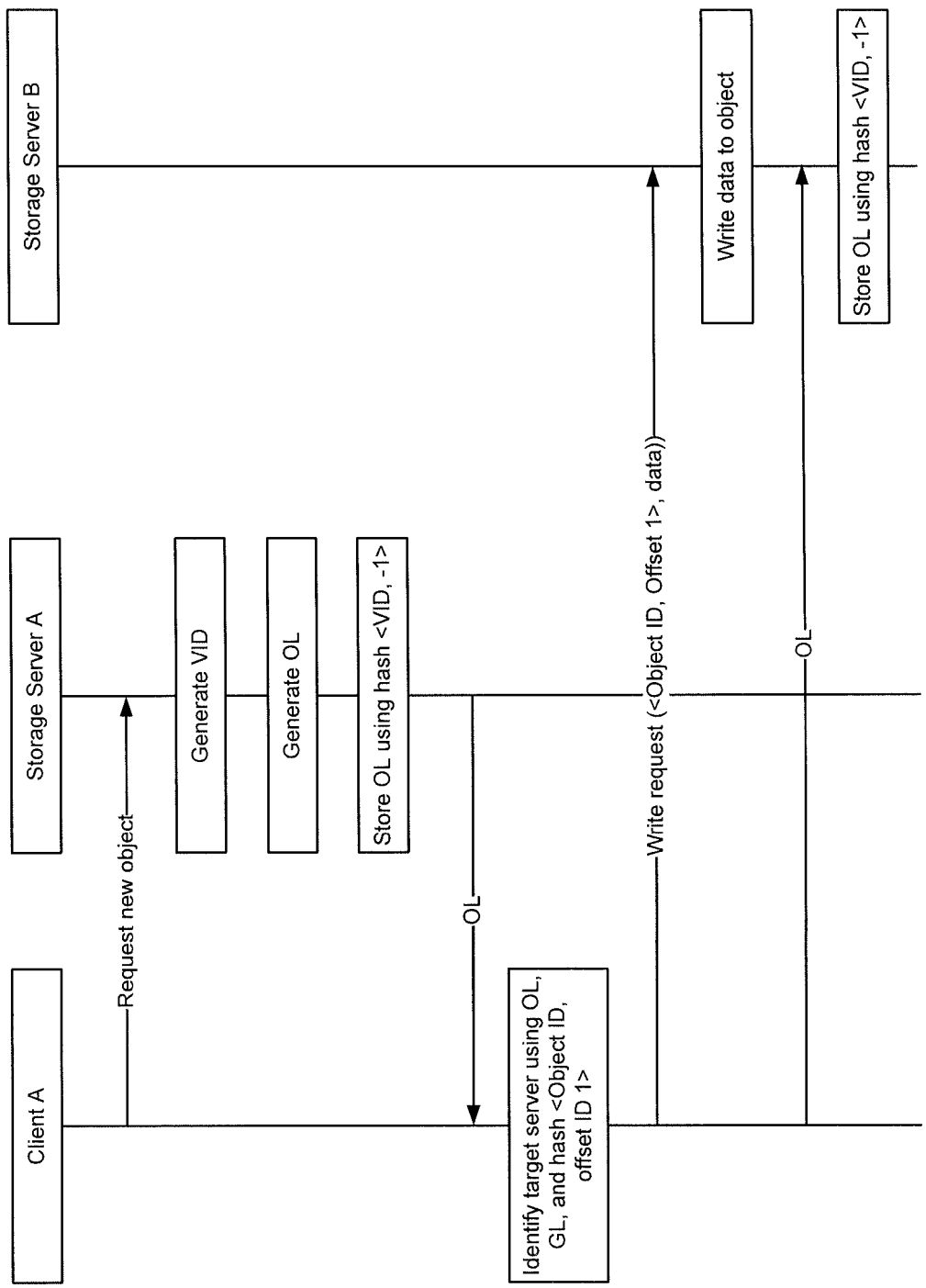
Figure 10C:
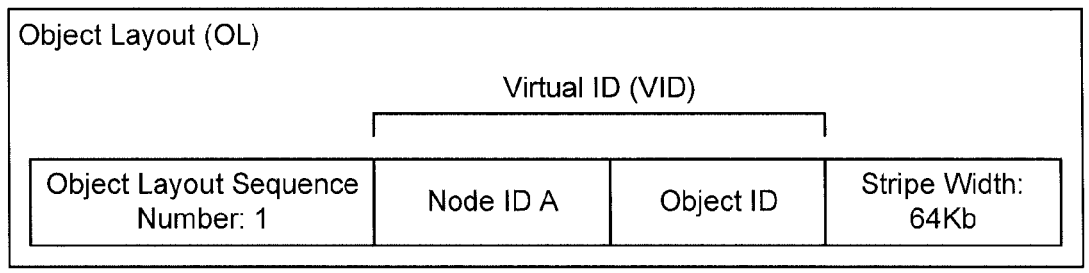
Figure 10D:
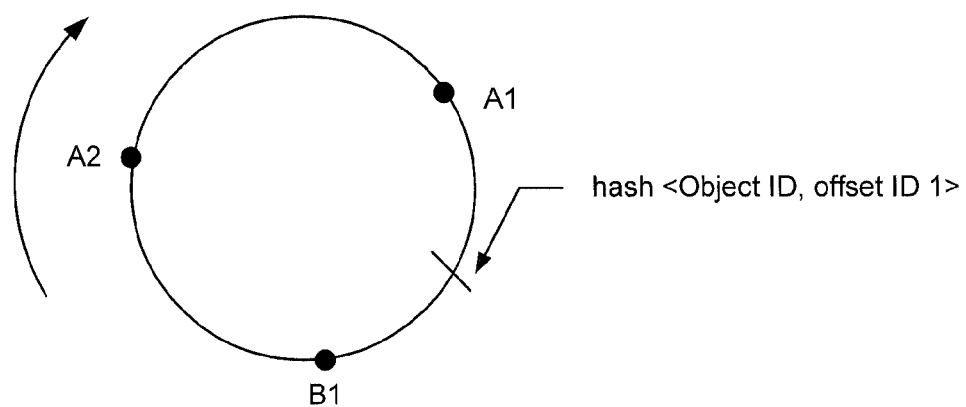

Referring to FIG. 10B, at some later point in time, Client A sends a request for a new object to Server A. As discussed above, the Client A may send the request for a new object to any of the storage servers that are writeable in the storage pool. In response to the request, Storage Server A generates a VID where the VID includes Node ID A and an object ID for a new object in the storage pool. Storage Server A subsequently generates an object layout (OL) for the new object. FIG. 10C shows the OL generated by Storage Server A. Referring to FIG. 10C, the OL includes the following information: (i) OL sequence number: 1, which indicates that the OL entry was created when the GL sequence number was equal to 1, (ii) a VID, which was previously generated by Storage Server A, and (iii) a stripe width: 64 Kb.

Returning to FIG. 10B, after generating the OL, Storage Server A stores the OL using hash <VID, −1> and also transmits a copy of the OL to Client A. At some later time, an application (not shown) executing on Client A requests to write data to <object ID, offset 1>. In response to the request, Client A identifies the target server using the OL (see FIG. 10C), the GL (see FIG. 10A), and hash <object ID, offset ID 1>, where offset ID 1 is generated by masking offset 1 with the stripe width obtained from the OL (see FIG. 10C).

As previously discussed, the OL is used to determine which storage servers were "writeable" in the global namespace at the time the OL was created. In this example, the OL sequence number is 1. Accordingly, the storage servers that were writeable in the global namespace at the time the OL was created will have server entries in the GL that have a node sequence number less than or equal to 1. Referring to the GL in FIG. 10A, the Server Entry A and Server Entry B both have node sequence numbers equal to 1 and, as such, were writeable in the global namespace when the OL was created. The node points (i.e., A1, A2, and B1) for each of the storage servers are obtained from the corresponding server entries.

The target server is subsequently identified using the node points (i.e., A1, A2, and B1) and hash <object ID, offset ID 1>. More specifically, referring to FIG. 10D, each of the node points (i.e., A1, A2, and B1) may be conceptually viewed as a point on a unit circle, where the values of the node points (i.e., A1, A2, and B1) dictate the location of the each of the node points on the unit circle. Further, hash <object ID, offset ID 1> may also be conceptually viewed as a point on the unit circle. Applying the principles of consistent hashing, starting at the point defined by hash <object ID, offset ID 1> and moving in a clockwise direction, the first node point encountered will be used to identify the target server. In this example, hash <object ID, offset ID 1> is located between A1 and B1. Moving in a clockwise direction, the first node point encountered is B1. B1 is a node point associated with Storage Server B. Accordingly, Storage Server B is identified as the target server.

Referring to FIG. 10B, Client A subsequently sends a write request specifying (hash <object ID, offset 1>, data) to Storage Server B. Storage Server B subsequently stores the data. Because Storage Server B does not include a copy of the OL, Client A also sends a copy of the OL to Storage Server B. Upon receipt, Storage Server B stores the OL using hash <VID, −1>.

Figure 10E:
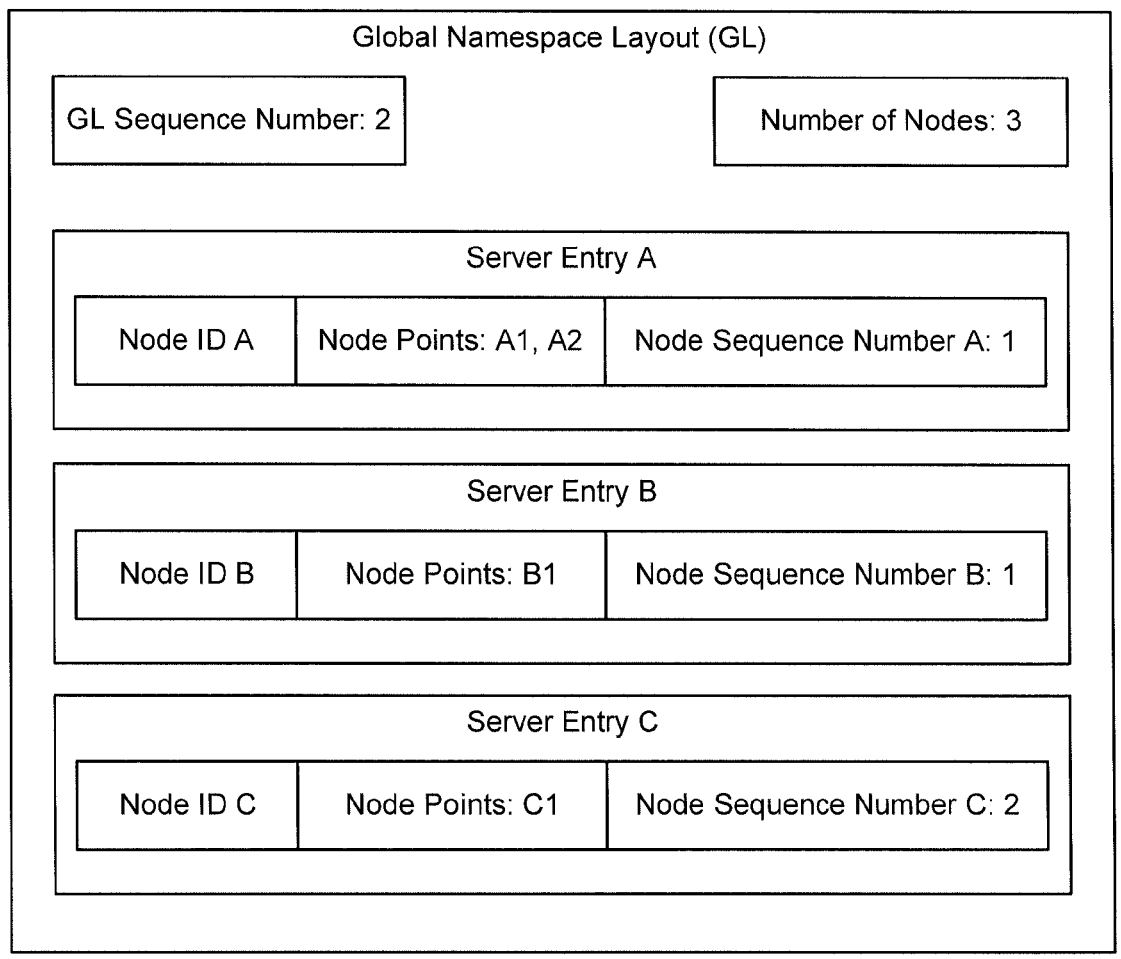
Figure 10G:
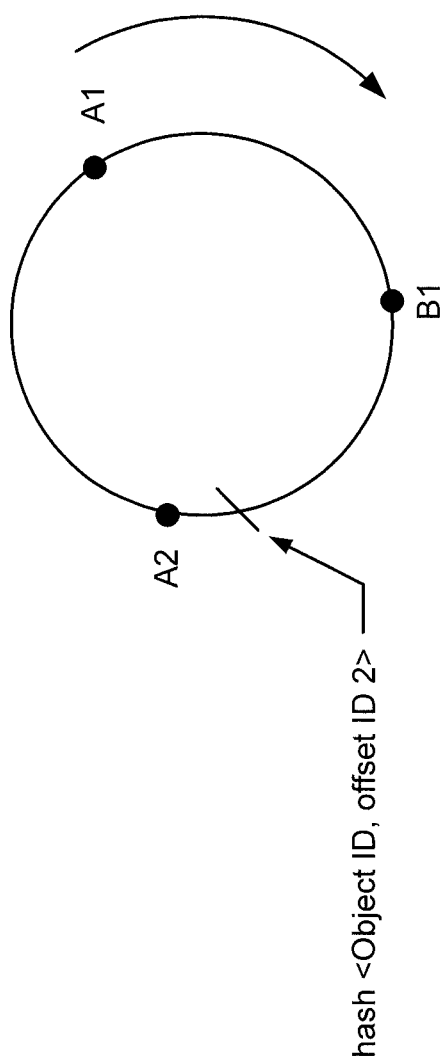

Referring to FIG. 10E, at some later point in time Storage Server C is added to the storage pool. As a result, the GL is updated to reflect the addition of the new storage server. The updated GL includes Server Entry C. Server Entry C corresponds to Storage Server C (see FIG. 10F) and specifies the following: (i) Node ID C, which uniquely identifies Storage Server C in the storage pool, (ii) node points: C1 (see FIG. 10G), and (iii) Node Sequence Number C:2, which indicates that the Server Entry C was added to the GL when the GL sequence number was equal to 2. The GL also includes a GL sequence number set to 2 to indicate the GL has been updated, and a node count set to 3 as there are three storage servers in the storage pool.

Referring to FIG. 10F, after the GL has been updated (see FIG. 10E), Client A receives a request to read data from <VID, offset 2>. Because the OL corresponds to the object identified by the VID that was previously provided to Client (see FIG. 10B), there is no need to request the OL from the storage pool.

Client A identifies a target server using the OL (see FIG. 10C), the GL (see FIG. 10E), and hash <object ID, offset ID 2>, where offset ID 2 is generated by masking offset 2 with the stripe width obtained from the OL (see FIG. 10C).

As previously discussed, the OL is used to determine which storage servers were "writeable" in the global namespace at the time the OL was created. In this example, the OL sequence number is 1. Accordingly, the storage servers that were writeable in the global namespace at the time the OL was created will have server entries in the GL that have a node sequence number less than or equal to 1. Referring to the GL in FIG. 10E, Server Entry A and Server Entry B both have node sequence numbers equal to 1 and, as such, were writeable in the global namespace when the OL was created. While the GL includes Server Entry C, because node sequence C is 2, Storage Server C was not writeable at the time the OL was created and, as such, is not used to identify the target server. The node points (i.e., A1, A2, and B1) for Storage Servers A and B are obtained from the corresponding server entries.

The target server is subsequently identified using the node points (i.e., A1, A2, and B1) and hash <object ID, offset ID 2>. More specifically, referring to FIG. 10G, each of the node points (i.e., A1, A2, and B1) may be conceptually viewed as a point on a unit circle, where the values of the node points (i.e., A1, A2, and B1) dictate the location of the each of the node points on the unit circle. Further, hash <object ID, offset ID 2> may also be conceptually viewed as a point on the unit circle. Applying the principles of consistent hashing, starting at the point defined by hash <object ID, offset ID 2> and moving in a clockwise direction, the first node point encountered will be used to identify the target server. In this example, hash <object ID, offset ID 2> is located between B1 and A2. Moving in a clockwise direction, the first node point encountered is A2. A2 is a node point associated with Storage Server A. Accordingly, Storage Server A is identified as the target server.

Referring to FIG. 10F, Client A subsequently sends a read request specifying <object ID, offset 2> to Storage Server A. Storage Server A subsequently obtains the requested data and sends it back to Client A.

Figure 10H:
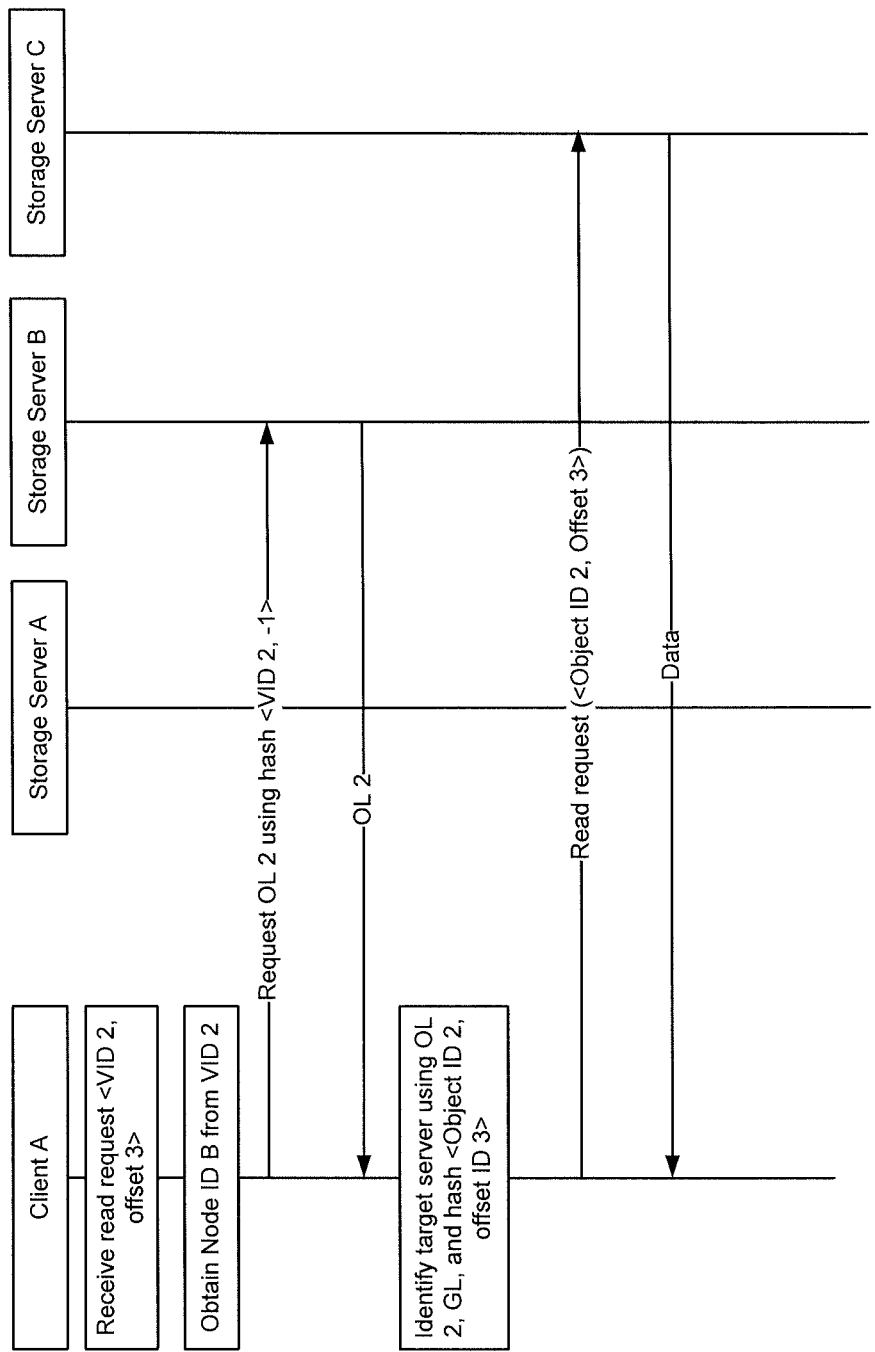
Figure 10I:
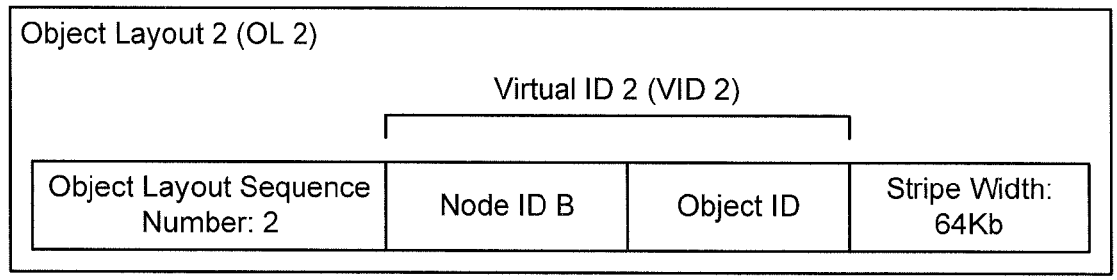

Referring to FIG. 10H, after the GL has been updated (see FIG. 10E), Client A receives a request to read data for <VID 2, offset 3>. Client A extracts Node ID B (which identifies Storage Server B) from VID 2 (see FIG. 10I) and subsequently sends a request for OL 2 to Storage Server B using hash <VID 2, −1>. In response to the request, Storage Server B obtains OL 2 and sends it back to Client A.

Figure 10J:
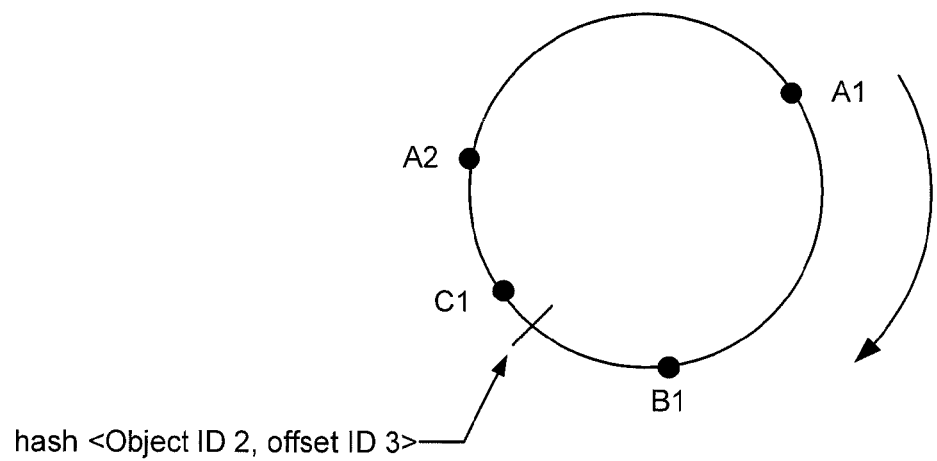

Client A then identifies the target server using OL 2 (see FIG. 10J), the GL (see FIG. 10E), and hash <object ID 2, offset ID 3>, where offset ID 3 is generated by masking offset 3 with the stripe width obtained from OL 2 (see FIG. 10J).

As previously discussed, the OL is used to determine which storage servers were "writeable" in the global namespace at the time the OL was created. In this example, the OL sequence number is 2 (see FIG. 10J). Accordingly, the storage servers that were writeable in the global namespace at the time OL 2 was created will have server entries in the GL that have a node sequence number less than or equal to 2. Referring to the GL in FIG. 10E, Server Entry A, Server Entry B, and Server Entry C all have node sequence numbers less than or equal to 2 and, as such, were writeable in the global namespace when OL 2 was created. The node points (i.e., A1, A2, B1, C1) for each of the storage servers are obtained from the corresponding server entries.

The target server is subsequently identified using the node points (i.e., A1, A2, B1, C1) and hash <object ID 2, offset ID 3>. More specifically, referring to FIG. 10J, each of the node points (i.e., A1, A2, B1, C1) may be conceptually viewed as points on a unit circle, where the values of the node points (i.e., A1, A2, B1, C1) dictate the location of the each of the node points on the unit circle. Further, hash <object ID 2, offset ID 3> may also be conceptually viewed as a point on the unit circle. Applying the principles of consistent hashing, starting at the point defined by hash <object ID 2, offset ID 3> and moving in a clockwise direction, the first node point encountered will be used to identify the target server. In this example, hash <object ID 2, offset ID 3> is located between B1 and C1. Moving in a clockwise direction, the first node point encountered is C1. C1 is a node point associated with Storage Server C. Accordingly, Storage Server C is identified as the target server.

Referring to FIG. 10H, Client A subsequently sends a read request specifying (<object ID 2, offset 3>) to Storage Server C. Storage Server C subsequently obtains the requested data and sends it back to Client A.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing data to a storage pool, comprising:
   receiving a virtual identifier (ID) and an offset for an object, wherein the virtual ID comprises an object ID and a node ID;
   obtaining, using the node ID, an object layout (OL) for the object from a first storage server;
   generating a value using the object ID and the offset;
   identifying a second storage server in the storage pool using a global namespace layout (GL), the OL, and the value; and
   issuing a write request to write data to the object in the second storage server, wherein the write request comprises the object ID and the offset.

2. The method of claim 1, wherein identifying the second storage server comprises using consistent hashing.

3. The method of claim 1, wherein the storage pool comprises a plurality of storage servers, wherein the GL specifies which of the plurality of storage servers were writeable for each GL sequence number and how writes were distributed across the plurality of storage servers writeable for each GL sequence.

4. The method of claim 1,
   wherein the OL specifies an OL sequence number, wherein the OL sequence number is set when the object is created, wherein the OL sequence number corresponds to a GL sequence number when the object was created, and wherein identifying the second storage server in the storage pool comprises:
      identifying a GL sequence number from the GL using the OL sequence number;
      determining, using the GL, which of the plurality of storage servers was writeable at the GL sequence number to obtain a set of storage servers, and
      identifying the second storage server from the set of storage servers.

5. The method of claim 1, wherein identifying the second storage server in the storage pool comprises using consistent hashing and information from the GL about the how writes were distributed across the storage pool.

6. The method of claim 1, wherein obtaining the OL from the first storage server comprises:
   generating a second value using the virtual ID and a special offset, and
   obtaining the OL from the first storage server using the second value.

7. The method of claim 1, wherein the OL comprises an OL sequence number, the virtual ID, and a stripe width.

8. The method of claim 1, wherein the GL comprises:
   a first server entry for the first storage server comprising:
      the node ID identifying the first storage server,
      a first node sequence number corresponding to a GL sequence number when the first storage server was added to the storage pool, and
      a node point used to determine which write requests are serviced by the first storage server.

9. The method of claim 1, further comprising:
   determining that the second storage server does not include a copy of the OL;
   issuing a request to store the OL to the second storage server.

10. The method of claim 1, further comprising:
    receiving a second virtual ID and a second offset for a second object, wherein the virtual ID comprises a second object ID and a second node ID;
    obtaining, using the second node ID, a second OL for the second object from the third storage server;
    generating a second value using the second object ID and the second offset;
    identifying the second storage server in the storage pool using the GL, the second OL, and the second value; and
    issuing a second write request to write data to the second object in the second storage server, wherein the second write request comprises the second object ID and the second offset.

11. The method of claim 1, further comprising:
    receiving a second virtual ID and an offset for a second object, wherein the second virtual ID comprises a second object ID and a second node ID;
    obtaining, using the second node ID, a second OL for the second object from the second storage server;
    generating a second value using the second object ID and the second offset;
    identifying the first storage server in the storage pool using the GL, the second OL, and the second value; and
    issuing a second write request to write data to the second object in the first storage server, wherein the second write request comprises the second object ID and the second offset.

12. A method for reading data to a storage pool, comprising:
    receiving a virtual ID and an offset for an object, wherein the virtual ID comprises a node ID;
    obtaining, using the node ID, an object layout (OL) for the object from a first storage server;
    generating a value using the object ID and the offset ID;

identifying a second storage server in the storage pool using a global namespace layout (GL), the OL, and the value; and issuing a read request to read data from the object in the second storage server, wherein the write request comprises the object ID and the offset.

13. The method of claim 12, wherein the identifying the second storage server comprises:
    identifying a set of storage servers from a plurality of storage servers in the storage pool using the GL and an OL sequence number from the OL;
    identifying the second storage server from the set of storage servers using the value.

14. The method of claim 12, wherein generating the value comprises:
    generating an offset ID using the offset and a stripe width, wherein the OL comprises the stripe width,
    wherein the value is generated using the object ID and the offset ID.

15. The method of claim 12, wherein identifying the second storage server comprises using consistent hashing.

16. A method for writing data to a storage pool, comprising:
    receiving a request for a new object;
    selecting a storage server from the storage pool, wherein the storage server is identified using a Node ID;
    requesting the storage server to generate a virtual ID, wherein the virtual ID comprises the node ID and an object ID for the object;
    generating an object layout (OL) for the object using the virtual ID;
    storing the OL in the storage server;
    after storing the OL in the storage server:
        receiving a write request to write data to the object, wherein the write request comprises the object ID and an offset;
        generating a value using the object ID and the offset ID;
        identifying a second storage server in the storage pool using a global namespace layout (GL), the OL, and the value; and
        issuing a write request to write the data to the object in the second storage server, wherein the write request comprises the object ID and the offset.

17. The method of claim 16, wherein selecting the storage server from the storage pool comprises using at least one selected from a group consisting of randomly selecting the storage server and selecting the storage server using a round robin algorithm.

18. The method of claim 16, wherein the node ID uniquely identifies the storage server in the storage pool.

19. The method of claim 16, wherein storing the OL in the storage server comprises:
    generating a second value using the virtual ID and a special offset to obtain a second value; and
    storing the OL in the storage server using the second value.

20. The method of claim 16, wherein generating the OL further comprises using a global sequence number from the GL.

* * * * *